(12) United States Patent  
Ningrat

(10) Patent No.: US 8,525,532 B2  
(45) Date of Patent: Sep. 3, 2013

(54) SYNC SIGNAL GENERATOR FOR A CAPACITIVE SENSOR

(75) Inventor: Kusuma Adi Ningrat, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 335 days.

(21) Appl. No.: 12/978,101

(22) Filed: Dec. 23, 2010

(65) Prior Publication Data

US 2012/0161794 A1    Jun. 28, 2012

(51) Int. Cl.
*G01R 27/26* (2006.01)

(52) U.S. Cl.
USPC ............................................ 324/679; 324/681

(58) Field of Classification Search
USPC ................. 324/672, 667, 678, 681, 679
See application file for complete search history.

(56) References Cited

U.S. PATENT DOCUMENTS

| 5,854,625 A | 12/1998 | Frisch et al. |
| 2008/0007534 A1 | 1/2008 | Peng et al. |
| 2008/0062148 A1* | 3/2008 | Hotelling et al. ............. 345/174 |
| 2008/0111714 A1* | 5/2008 | Kremin ............................ 341/33 |
| 2009/0045822 A1* | 2/2009 | Nosovitsky et al. ........... 324/686 |
| 2009/0244014 A1 | 10/2009 | Hotelling et al. |
| 2009/0322410 A1 | 12/2009 | David et al. |
| 2010/0097077 A1 | 4/2010 | Philipp et al. |

OTHER PUBLICATIONS

Lei et al., "An Oversampled Capacitance-to-Voltage Converter IC With Application to Time-Domain Characterization of MEMS Resonators", IEEE Sensors Journal, Dec. 2005, pp. 1353-1361, vol. 5, No. 6.

* cited by examiner

*Primary Examiner* — Vincent Q. Nguyen

(74) *Attorney, Agent, or Firm* — Hogan Lovells US LLP

(57) ABSTRACT

A sync signal generator for a capacitive sensor includes a charge amplifier having an input for coupling to an inactive receive line in the capacitive sensor, a first comparator having a first input for receiving a first threshold voltage, a second input coupled to an output of the charge amplifier, and an output for providing a first sync signal, and a second comparator having a first input for receiving a second threshold voltage, a second input coupled to the output of the charge amplifier, and an output for providing a second sync signal. The charge amplifier includes an operational amplifier having a feedback circuit including a capacitor and a switch. The first threshold voltage is provided by a first digital-to-analog converter, and the second threshold voltage is provided by a second digital-to-analog converter.

20 Claims, 7 Drawing Sheets

SYNC SIGNAL GENERATOR FOR A CAPACITIVE SENSOR

BACKGROUND OF THE INVENTION

1. Field of the Invention

The present invention is related to touch-screen systems and more particularly to a sync signal generator for a capacitive sensor.

2. Description of the Related Art

One-layer sensor panels are cost effective because of their simple structure. These sensor panels can be laminated directly on top of an LCD module, for example. A typical one-layer sensor panel laminated directly on top of an LCD module is shown in FIG. 1C. To realize a one layer sensor, a diamond shaped ITO layer 108 is used. The diamond ITO layer is laid out in one layer as shown. At the intersection at the center of FIG. 1C, the transmit Tx diamonds 108 are connected by a small ITO track, while the receive Rx diamonds 108 are connected with a very thin metal bridge 112, which is separated by an insulator 110 from the sensor Y-lines. The metal bridge 112 is in the same layer of the metal that is used to route the Tx and Rx lines to a controller at the side of the panel.

In the laminated capacitive sensor panel shown in FIG. 1C, the one-layer panel does not have a GND layer to shield the sensor from LCD noise. In particular, the VCOM voltage in the LCD module can generate noise that is disruptive to touch sensing. The VCOM voltage is a periodic signal used in LCD modules as is known in the art. The VCOM signal is found in a plane that usually covers the whole LCD panel and it is located nearest to the laminated sensor panel.

Referring now to FIG. 1A, the problem of VCOM noise coupling is illustrated. A portion 100 of the sensor panel according to the prior art is shown in which the VCOM layer 104, capacitive layer 106, and a representative receive line 102 are shown in plan view and in a cross-sectional view. The receive line 102 and the VCOM layer 104 in a laminated capacitive sensor panel form a capacitance $C_X$, which is significantly large compared to the sensor cross-capacitance desired to be measured. When the VCOM voltage signal (similar to a square wave) changes, a large amount of charge is injected into this capacitance and the charge is undesirably detected at the sensor as noise. After the VCOM signal switches, it settles to a voltage level for a certain period of time, and this time period is a clean and safe time to measure the cross-capacitance of the sensor correctly.

Further cross-sectional details are shown in FIG. 1B, wherein the VCOM layer is shown to be part of an LCD layer including the VCOM layer 104A, a liquid crystal layer 104B, and TFT (Thin Film Transistor) layer 104C as is known in the art.

Referring now to FIG. 2, an HSYNC signal tells the sensor when exactly the VCOM voltage switches, and immediately after the HSYNC signal is triggered, the sensor can start the capacitance measurements. The prior art sensor system 200 includes a sensor panel and LCD module 202 in communication with the LCD driver 206, which generates the HYSNC signal. The touch sensor integrated circuit 204, which is in communication with the sensor panel and LCD module 202, receives the HSYNC signal for proper sensing of the cross-capacitance without unnecessary VCOM-generated noise. To synchronize the sensor timing with VCOM activity, the touch sensor integrated circuit 204 can tap the HSYNC signal from the LCD driver 206. However, this requires an electrical connection as shown in FIG. 2. Unfortunately, not all LCD modules have this connection ready, hence some modification may be required.

What is desired, therefore, is a touch screen controller that is able to generate its own SYNC signal to be able to operate with all LCD displays so that there is synchronization between sensing time and VCOM activity. Such a touch screen controller would be as effective as the prior art system shown in FIG. 2 to filter out noise generated by the LCD module.

SUMMARY OF THE INVENTION

According to the present invention, a sync signal generator for a capacitive sensor includes a charge amplifier having an input for coupling to an inactive receive line in the capacitive sensor, a first comparator having a first input for receiving a first threshold voltage, a second input coupled to an output of the charge amplifier, and an output for providing a first sync signal, and a second comparator having a first input for receiving a second threshold voltage, a second input coupled to the output of the charge amplifier, and an output for providing a second sync signal. The charge amplifier includes an operational amplifier having a feedback circuit including a capacitor and a switch. The first threshold voltage is provided by a first digital-to-analog converter, and the second threshold voltage is provided by a second digital-to-analog converter.

The sync signal generator can be included in a touch-screen system including a sensor panel and LCD display, an LCD driver in communication with the sensor panel and LCD display, the LCD driver having an output for providing a periodic signal, and the sync signal generator in communication with a touch sensor for the sensor panel.

The method of generating a sync signal for use in a touch sensor circuit according to the present invention includes converting the charge on an inactive receive line of a capacitive sensor into an output voltage, comparing the output voltage to a first threshold voltage to provide a first sync signal for use in the touch sensor circuit, and comparing the output voltage to a second threshold voltage to provide a second sync signal for use in the touch sensor circuit.

BRIEF DESCRIPTION OF THE DRAWINGS

Other objects and advantages of the present invention will become apparent from the following description of the preferred embodiment with reference to the drawings, in which.

DETAILED DESCRIPTION

Figure 3:
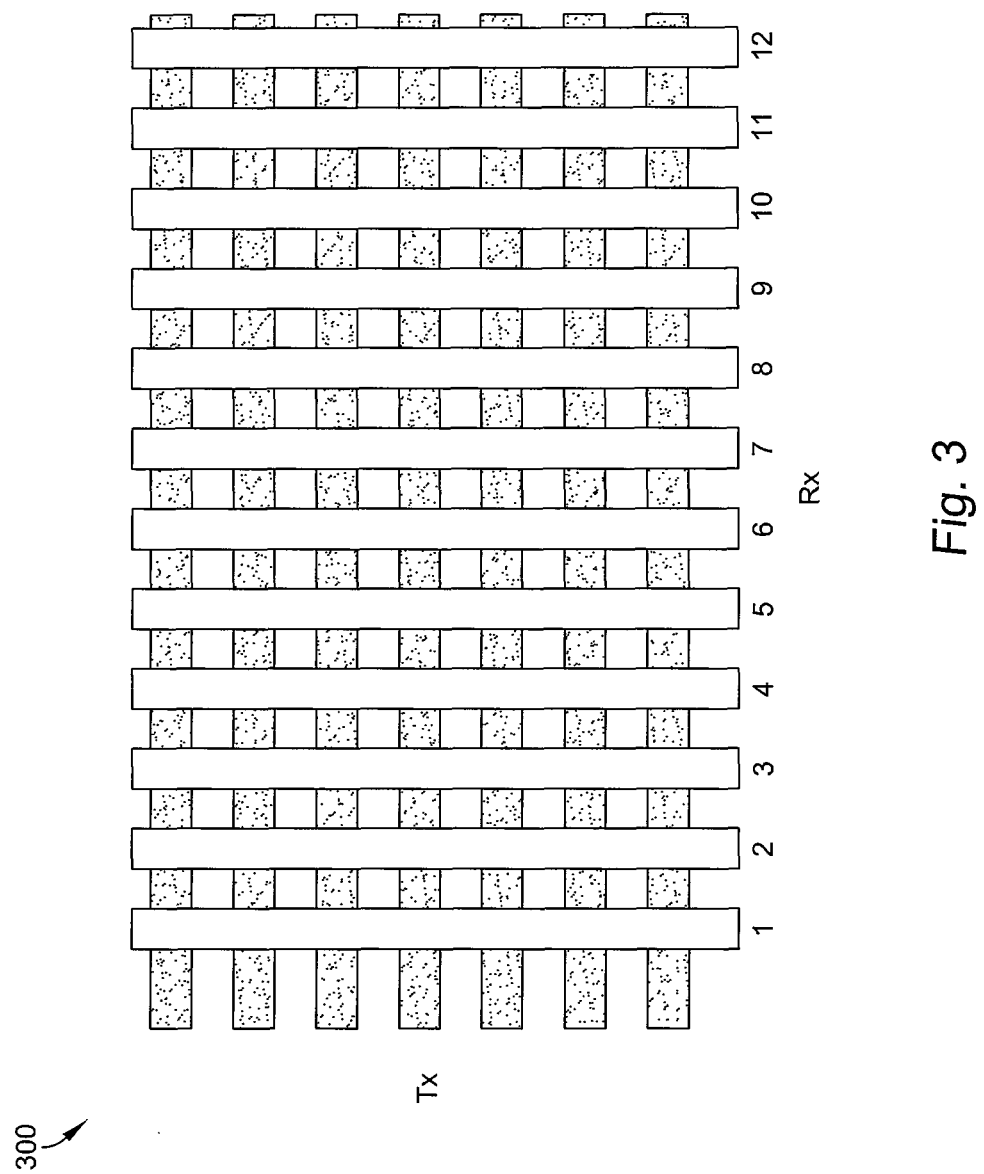
FIG. 3 is a diagram of the transmit and receive lines of a touch-screen for the purpose of illustrating a scanning sequence according to the present invention.

Referring now to FIG. 3, the grid pattern of receive lines Rx and transmit lines Tx is shown for the purpose of describing a scanning sequence according to the present invention. Due to limitations in the sensor hardware, sensing is done in two cycles. For example, a first half of the receive lines is sensed (Rx lines 1-6) and then the other half of the receive lines is sensed (Rx lines 7-12). One of the inactive Rx lines can be used to detect VCOM activity. No specific pattern is required, and any unused Rx lines can be used for this purpose.

To reduce the size of the touch sensor integrated circuit, only a limited amount of sensor hardware is available. To scan the whole touch-screen, a multiplexer is coupled to all of the Rx lines. For example, there may be six sensor circuits for scanning twelve Rx lines. The sensor circuits are initially connected to receive lines Rx1-Rx6. After the sensor circuits are finished measuring the cross-capacitance, the sensor circuits are then coupled to receive lines Rx7-Rx12. In this case six Rx lines are always free, and the SYNC signal generator can be coupled to one of these free lines as is described in further detail below.

Figure 1A:
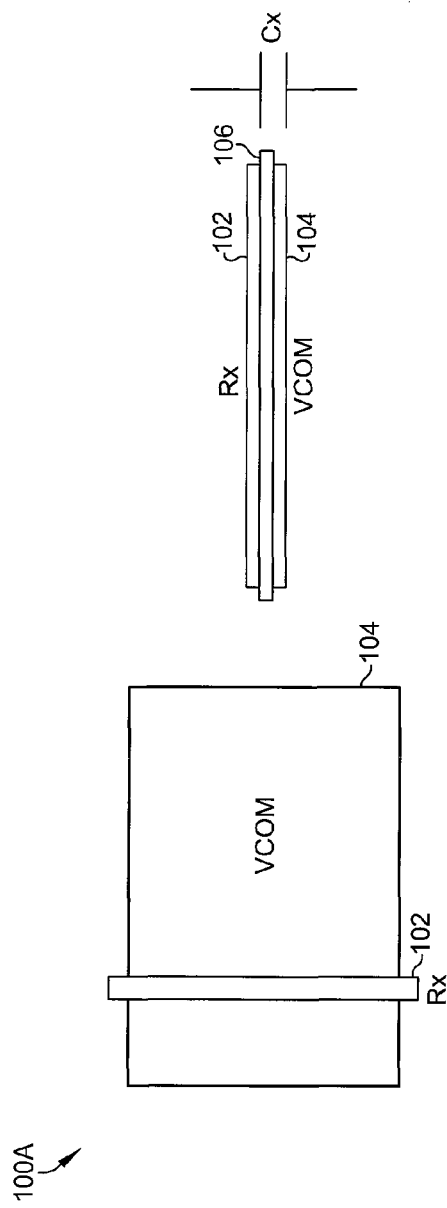
FIG. 1A is a cross sectional diagram of a laminated capacitive sensor panel according to the prior art.
Figure 1B:
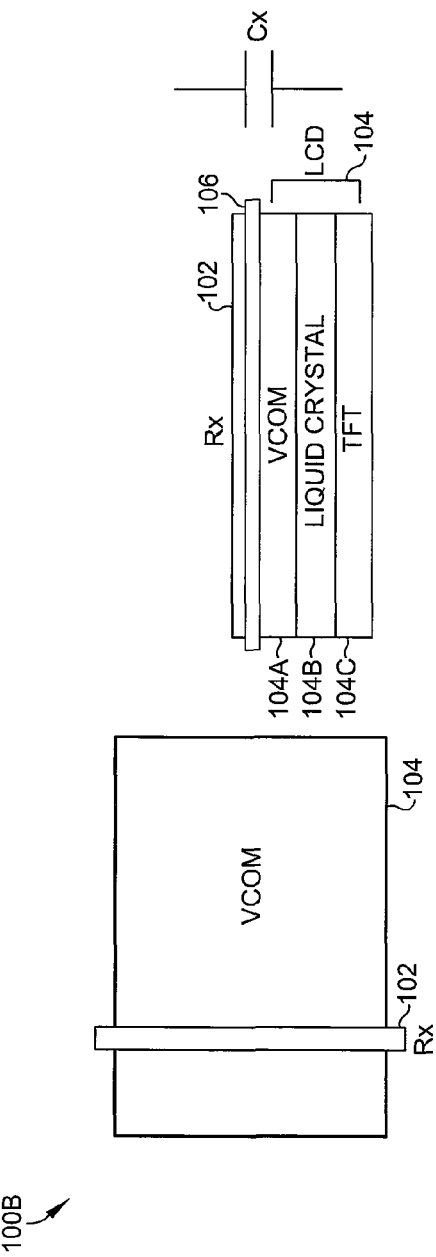
FIG. 1B is plan view and cross sectional diagram of a portion of the sensor panel shown in FIG. 1A.
Figure 2:
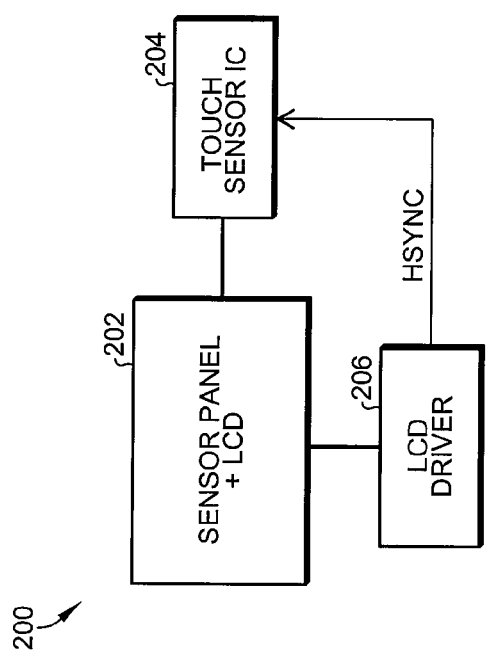
FIG. 2 is a first block diagram of the electrical components associated with the laminated capacitive sensor panel of FIG. IA according to the prior art.
Figure 1C:
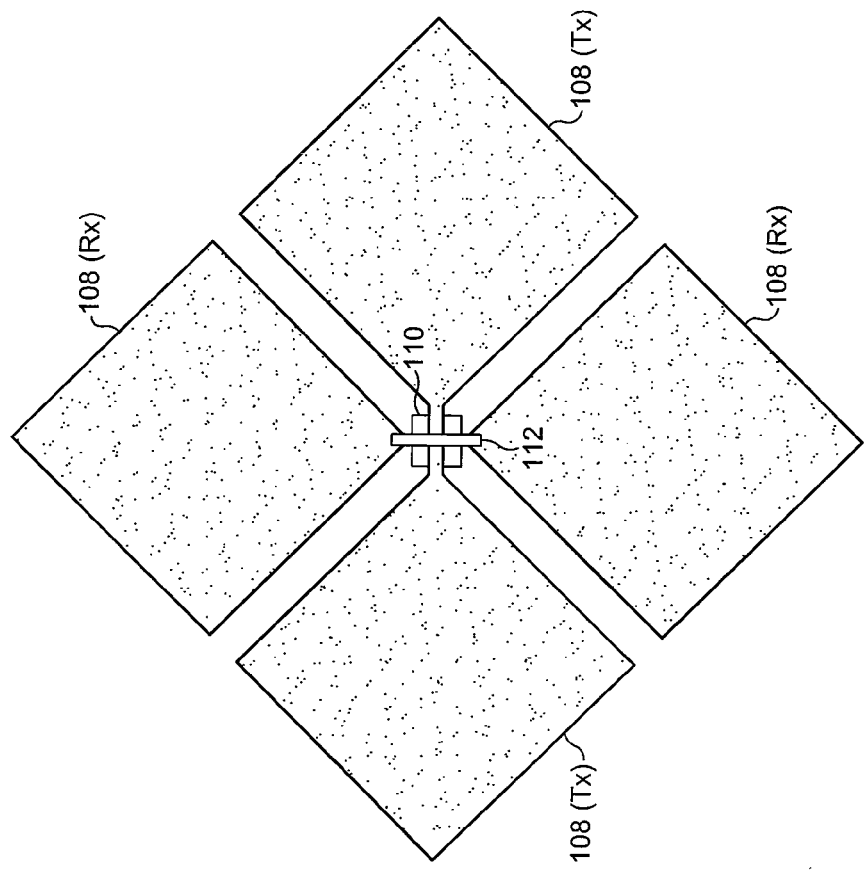
FIG. 1C is plan view and a more detailed cross sectional diagram of a portion of the sensor panel shown in FIG. 1A.
Figure 4:
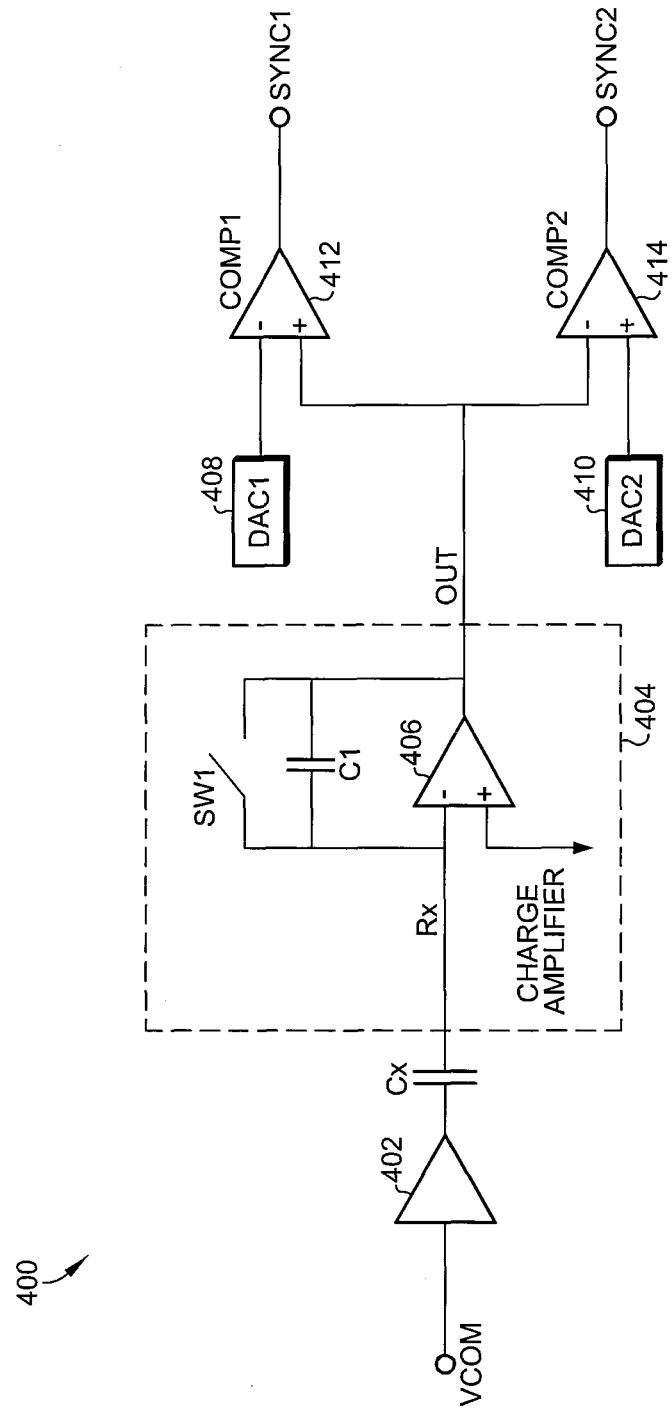
FIG. 4 is a schematic diagram of a VCOM detection circuit for generating first and second SYNC signals according to the present invention.

A VCOM detection circuit 400 for generating two sync signals according to the present invention is shown in FIG. 4. The sync signal generator 400 can be used in conjunction with a capacitive sensor and includes a charge amplifier 404 having an input for coupling to an inactive receive line in the capacitive sensor. The VCOM plane is shown as an amplifier 402 for driving the Cx capacitance previously shown in FIG. 1. The actual input of the SYNC generator circuit 400 is the unused Rx receive line. A first comparator 412 has a first input for receiving a first threshold voltage, a second input coupled to an output of the charge amplifier, and an output for providing a first sync signal SYNC1. A second comparator 414 has a first input for receiving a second threshold voltage, a second input coupled to the output of the charge amplifier, and an output for providing a second sync signal SYNC 2. In the present invention there are two SYNC signals. The SYNC1 signal goes high when the falling edge of the VCOM signal occurs, while the SYNC2 signal goes high when the rising edge of the VCOM signal occurs. The charge amplifier 404 includes an operational amplifier 406 having a feedback circuit including a capacitor C1 and a switch SW1. The operation of switch SW1 is described in further detail below. The first threshold voltage is provided by a first digital-to-analog converter 408. The second threshold voltage is provided by a second digital-to-analog converter 410.

In operation, the first comparator COMP1 412 will be triggered if the OUT signal is higher than the threshold voltage provided by the DAC1 408. The second comparator COMP2 414 will be trigger if the OUT signal is lower than the threshold voltage provided by the DAC2 410. When the comparators 412 or 414 are triggered, they provide signals to SYNC1 and SYNC2 that can be used as synchronization signals for sensing timing. These signals are used by the sensor integrated circuit in lieu of the HYSNC signal normally provided by the LCD driver. The first and second threshold voltages provided by the first DAC 408, the second DAC 410 and the capacitor C1 should all be adjustable to adapt to the Cx value and the VCOM voltage for a given application. Before starting a sensing cycle, switch SW1 is opened. Once a SYNC signal is detected, switch SW1 is closed and the sensing cycle is started after a predetermined delay time. In the sensing cycle, after the Tx signal is applied, switch SW1 can be opened again to detect the next VCOM activity.

Figure 5:
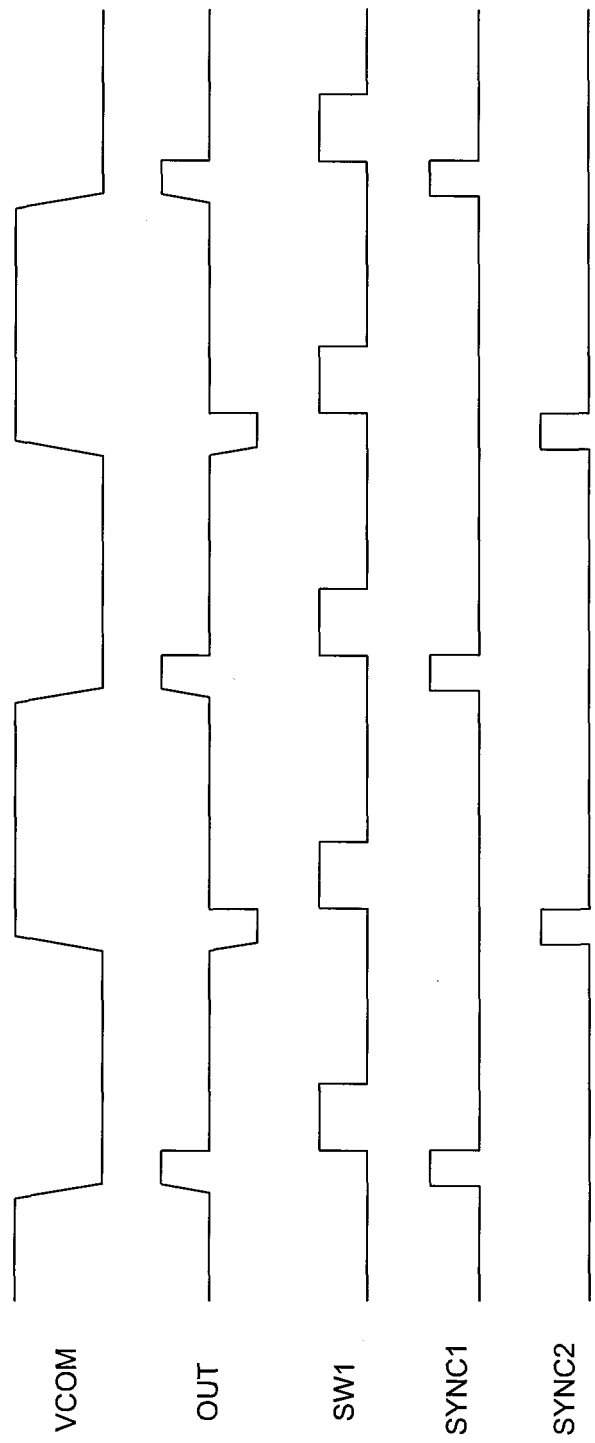
FIG. 5 is a timing diagram associated with the circuit of FIG. 4.

The VCOM detection method is illustrated in further detail with respect to the timing diagram shown in FIG. 5. The VCOM signal is shown approximating a square wave. The OUT signal is shown having positive and negative pulses corresponding generally to the switching transitions of the VCOM signal. The SW1 switch signal is shown as described above being delayed with respect to the OUT signal. The SYNC1 signal roughly corresponds to the positive-going OUT pulses, and the SYNC 2 switch signal roughly corresponds to the negative-going OUT pulses.

Figure 6:
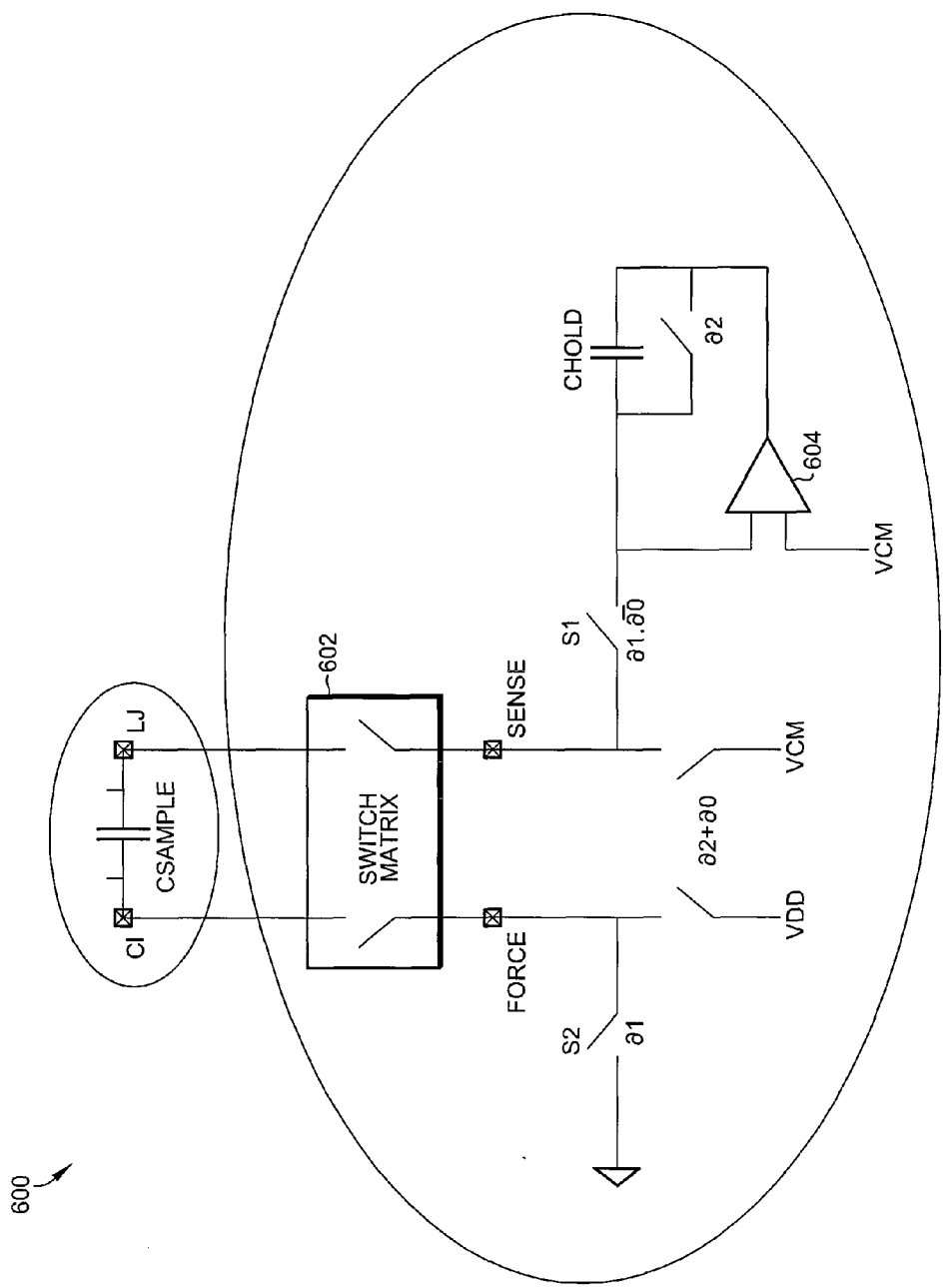
FIG. 6 is a schematic diagram of a capacitance-to-voltage converter for use with the touch sensor of the present invention.

Referring now to FIG. 6, a capacitance-to-voltage converter 600 according to the present invention is shown for use in sensing the cross-capacitance. The previously generated SYNC signals can be used by converter 600 to coordinate proper sensing of the cross-capacitance of the touch-screen. Converter 600 includes a switch matrix 602 that is coupled to the grid pattern of the touch-screen to measure the cross-capacitance of the intersection of a transmit and receive line. Switches S1 and S2 are used to couple the switch matrix 602 to a charge amplifier 604 including a hold capacitor Chold and a switch. Converter 600 operates a force and sense cycle across the Csample cross-capacitance shown in FIG. 6. During a sample phase capacitors Csample and Chold are reset. The Force and Sense lines shown in FIG. 6 are forced to VDD and VCM. VCM is a common mode voltage that is halfway between ground and VDD. During an integration phase, charge is transferred from Csample onto Chold. The Force line is forced to ground while the Sense line is sensed. During a hold phase, capacitor Csample is reset, but capacitor Chold is not reset. An analog-to-digital converter (not shown in FIG. 6) is used to measure the output of the charge amplifier 604. The analog-to-digital converter can operate during the entirety of the hold phase. While an example of a capacitance-to-voltage converter is shown, the exact manner of using the SYNC signals and the exact capacitance-to-voltage converter implementation can be changed as desired for a particular implementation.

Figure 7:
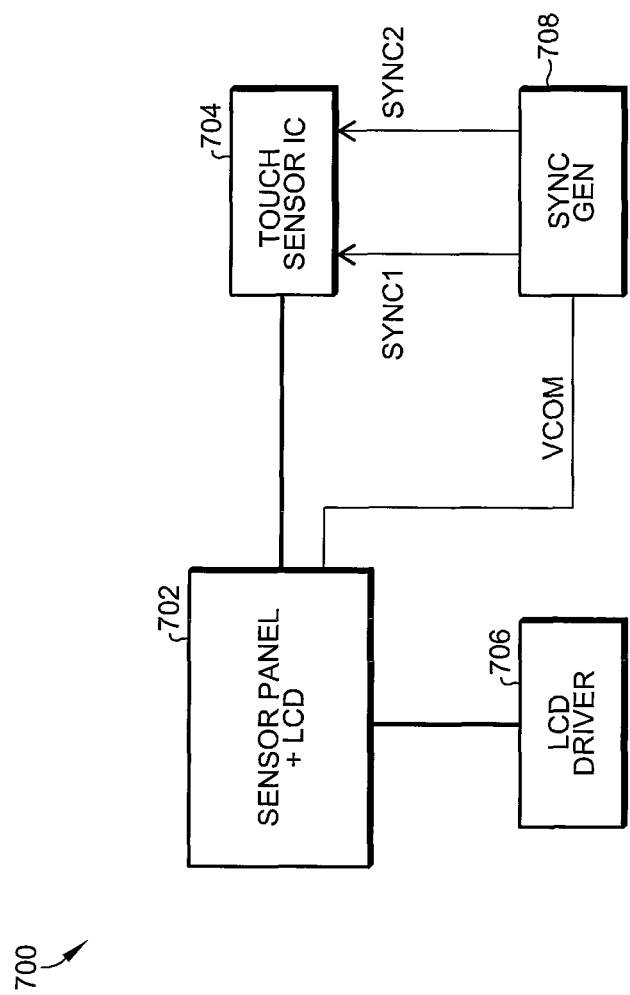
FIG. 7 is a second block diagram of the electrical components associated with the laminated capacitive sensor panel of FIG. 1A according to the present invention.

Referring now to FIG. 7, the SYNC1 and SYNC2 signals are now used to tell the sensor integrated circuit (IC) 704 when the VCOM voltage switches, and immediately after the SYNC signals are triggered, the sensor 704 can start the capacitance measurements according to the present invention. The sensor system 700 according to the present invention includes a sensor panel and LCD module 702 in communication with the LCD driver 706, which also generates the VCOM signal through an unused receive line. The touch sensor IC 704, which is in communication with the sensor panel and LCD module 702, receives the SYNC1 and SYNC2 signals from the SYNC generator circuit 708 for proper sensing of the cross-capacitance without unnecessary VCOM-generated noise. To synchronize the sensor timing with VCOM activity, the touch sensor integrated circuit 704 can tap the SYNC1 and SYNC2 signals from the SYNC generator 708. A specific timing signal from the LCD module is not required according to the present invention.

It is an advantage of the present invention that the SYNC generator circuit can replace the electrical connection for generating an HSYNC signal according to the prior art. Thus, the touch sensor controller according to the present invention can be used with any one-layer sensor panel technology with or without the need of a separate HSYNC connection.

Although the present invention has been described in connection with a preferred embodiment and modifications thereto, those of ordinary skill in the art will understand that many other modifications can be made to the present invention within the scope of the claims that follow. Accordingly, it is not intended that the scope of the invention in any way be limited by the above description, but instead be determined entirely only by reference to the claims that follow.

I claim:

1. A sync signal generator for a capacitive sensor comprising:
    a charge amplifier having an input coupled to an inactive receive line in the capacitive sensor;
    a first comparator having a first input for receiving a first threshold voltage, a second input coupled to an output of the charge amplifier, and an output for providing a first sync signal; and
    a second comparator having a first input for receiving a second threshold voltage, a second input coupled to the output of the charge amplifier, and an output for providing a second sync signal.

2. The sync signal generator of claim 1 wherein the charge amplifier comprises an operational amplifier.

3. The sync signal generator of claim 2 wherein the operational amplifier further comprises a feedback circuit.

4. The sync signal generator of claim 3 wherein the feedback circuit comprises a capacitor.

5. The sync signal generator of claim 3 wherein the feedback circuit comprises a switch.

6. The sync signal generator of claim 1 wherein the first threshold voltage is provided by a first digital-to-analog converter.

7. The sync signal generator of claim 1 wherein the second threshold voltage is provided by a second digital-to-analog converter.

8. A touch-screen system comprising:
    a sensor panel and LCD display;
    an LCD driver in communication with the sensor panel and LCD display, the LCD driver having an output for providing a periodic signal; and
    a sync signal generator in communication with a touch sensor for the sensor panel, the sync signal generator comprising:
    a charge amplifier having an input coupled to an inactive receive line in the sensor panel;
    a first comparator having a first input for receiving a first threshold voltage, a second input coupled to an output of the charge amplifier, and an output for providing a first sync signal to the touch sensor; and
    a second comparator having a first input for receiving a second threshold voltage, a second input coupled to the output of the charge amplifier, and an output for providing a second sync signal to the touch sensor.

9. The sync signal generator of claim 8 wherein the charge amplifier comprises an operational amplifier.

10. The sync signal generator of claim 9 wherein the operational amplifier further comprises a feedback circuit.

11. The sync signal generator of claim 10 wherein the feedback circuit comprises a capacitor.

12. The sync signal generator of claim 10 wherein the feedback circuit comprises a switch.

13. The sync signal generator of claim 8 wherein the first threshold voltage is provided by a first digital-to-analog converter.

14. The sync signal generator of claim 8 wherein the second threshold voltage is provided by a second digital-to-analog converter.

15. A method of generating a sync signal for use in a touch sensor circuit comprising:
    converting the charge on an inactive receive line of a capacitive sensor into an output voltage;
    comparing the output voltage to a first threshold voltage to provide a first sync signal for use in the touch sensor circuit; and
    comparing the output voltage to a second threshold voltage to provide a second sync signal for use in the touch sensor circuit.

16. The method of claim 15, wherein the charge on the inactive receive line is converted into an output voltage using a charge amplifier.

17. The method of claim 15, wherein the output voltage is compared to a first threshold voltage using a comparator.

18. The method of claim 15, wherein the output voltage is compared to a second threshold voltage using a comparator.

19. The method of claim 15, wherein the first threshold voltage is provided by a first digital-to-analog converter.

20. The method of claim 15, wherein the second threshold voltage is provided by a second digital-to-analog converter.

* * * * *